(12) United States Patent
Tschetter et al.

(10) Patent No.: US 6,441,541 B1
(45) Date of Patent: Aug. 27, 2002

(54) OPTICAL INTERFERENCE COATINGS AND LAMPS USING SAME

(75) Inventors: Charles D. Tschetter, Mayfield Village; Rajasingh S. Israel, Westlake; Denis A. Lynch, South Euclid, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/382,744

(22) Filed: Aug. 25, 1999

(51) Int. Cl.⁷ .............................. H01J 61/40; H01K 1/26
(52) U.S. Cl. ........................ 313/113; 313/632; 313/112; 313/580
(58) Field of Search .................... 313/635, 112, 313/113, 580, 110, 111; 359/589, 588, 586, 359; 362/296, 341

(56) References Cited

U.S. PATENT DOCUMENTS

| | | | |
|---|---|---|---|
| 4,161,014 A | 7/1979 | Dey et al. | |
| 4,161,015 A | 7/1979 | Dey et al. | |
| 5,140,457 A | 8/1992 | Letter | |
| 5,142,197 A | * 8/1992 | Kawakatsu | 313/112 X |
| 5,143,445 A | 9/1992 | Bateman et al. | |
| 5,569,970 A | 10/1996 | Dynys et al. | |
| 5,587,626 A | 12/1996 | Parham et al. | |
| 5,627,426 A | 5/1997 | Whitman et al. | |
| 5,658,612 A | 8/1997 | Li et al. | |

* cited by examiner

Primary Examiner—Ashok Patel
(74) Attorney, Agent, or Firm—Fay, Sharpe, Fagan, Minnich & McKee, LLP

(57) ABSTRACT

A lamp including a light source (30) housed within a reflector (10), the reflector further includes a coating (24) over a major portion of an inner (20) and/or outer surface (22). The coating (24) is comprised of multiple layers of high and low index of refraction materials to provide at least 90% reflectance between about 425 and 750 nanometers and less than 20% reflectance peaks between about 900 nanometers and 1800 nanometers

13 Claims, 4 Drawing Sheets

OPTICAL INTERFERENCE COATINGS AND LAMPS USING SAME

BACKGROUND OF THE INVENTION

This invention relates to optical interference filters and, more particularly to lamps including an optical interference filter to tailor the transmitted light energy.

Multi-layer optical interference filters and their use with electric lamps are well known to those skilled in the art. Commercially available, high efficiency lamps including an optical interference filter have achieved considerable commercial success such as the MR™ lamps available from General Electric Company. This lamp includes a double ended light source (such as a halogen-incandescent lamp) mounted inside a parabolic reflector. The light source is fabricated from a fused quartz envelope and the parabolic reflector includes a multi-layer coating. In this regard, reflectors have been an essential component of lighting applications for many years. Various types of reflectors are in use ranging from simple polished metal reflectors to coated glass and plastic reflectors. These coated reflectors may have a single layer coating of a reflective metal, a protected reflective metal, an enhanced metal coating or a complex multi-layer coating which can provide both color correction and reduction of unwanted regions of radiation for a specific lighting application. For example, in applications such as movie projectors, slide projectors and overhead viewers it is desirable to reduce the forward transmission of heat or the infrared component of the reflected light as much as possible. These reflectors are known as cold mirrors because of their ability to reduce the amount of heat (infrared radiation) present in the reflected beam.

Typically, cold mirror coatings are based on a high reflectance array consisting of alternating layers of high and low index films, each layer having an optical thickness of one Quarter-Wave Optical Thickness (QWOT). The optical thickness is defined as the product of the physical thickness times the refractive index of the film. The QWOT is referenced to a conveniently chosen design wavelength. For example, at a design wavelength of 1000 nm, a QWOT equals 250 nm. Since a single high reflectance array reflects across only a portion of the visible region, two or more arrays may be combined for an extended high reflectance band across the visible spectrum.

Cold mirror reflector have achieved a high degree of acceptance in display lighting applications where their high degree of reflectance of visible light of the proper color temperature has been found very attractive. Therefore, a combination of high visible reflectance, good color maintenance over the life of the reflector, and the ability to select varying degrees of infrared and ultraviolet reduction have emerged as important factors in lighting coatings.

Optical interference filters are often made of alternating layers of refractory metal oxides having high and low indexes of refraction. Refractory metal oxides are often used because they are able to withstand the relatively high temperatures (e.g 400° C. to 900° C.) that develop during lamp operation. Such oxides include, for example, titania, hafnia, tantala and niobia for the high index of refraction material and silica or magnesia fluoride for the low index of refraction materials. Examples of these types of filters are provided in U.S. Pat. Nos. 5,143,445 and 5,569,970, wherein these materials provide high reflectance in the visible spectrum between, for example, 380 to 770 nanometers.

Certain uses for these lamps, i.e., photographic and photocopying require low reflected infrared radiation, improved color maintenance and high color temperature. In this regard, the subject invention is provided to minimize the amount of heat which is generated in a forward direction by providing a lamp with an optical interference filter which passes infrared radiation through the back of the reflector.

BRIEF SUMMARY OF THE INVENTION

In an exemplary embodiment of the invention, the lamp of the present invention comprises a light source and a reflector. The reflector includes a coating over a major portion of its inner and/or outer surface. The coating is comprised of multiple layers of high and low index of refraction materials to provide at least 90% reflectance between about 425 and 750 nanometers and less than 20% reflectance peaks between about 900 and 1,800 nanometers, preferably 830 to 1,800 nm.

The present lamp provides a number of advantages over the prior art. For example, the "right hand edge" of the reflectance curve has been moved close to 800 nanometers, substantially decreasing the amount of infrared radiation which is reflected. Therefore, a greater amount of infrared radiation passes through the rear of the lamp, reducing the amount of unwanted energy (i.e. energy not providing visible light) transmitted forwardly by the lamp. In addition, the lamp advantageously provides excellent lumen output and a desirable color temperature.

DETAILED DESCRIPTION OF THE INVENTION

Figure 1:
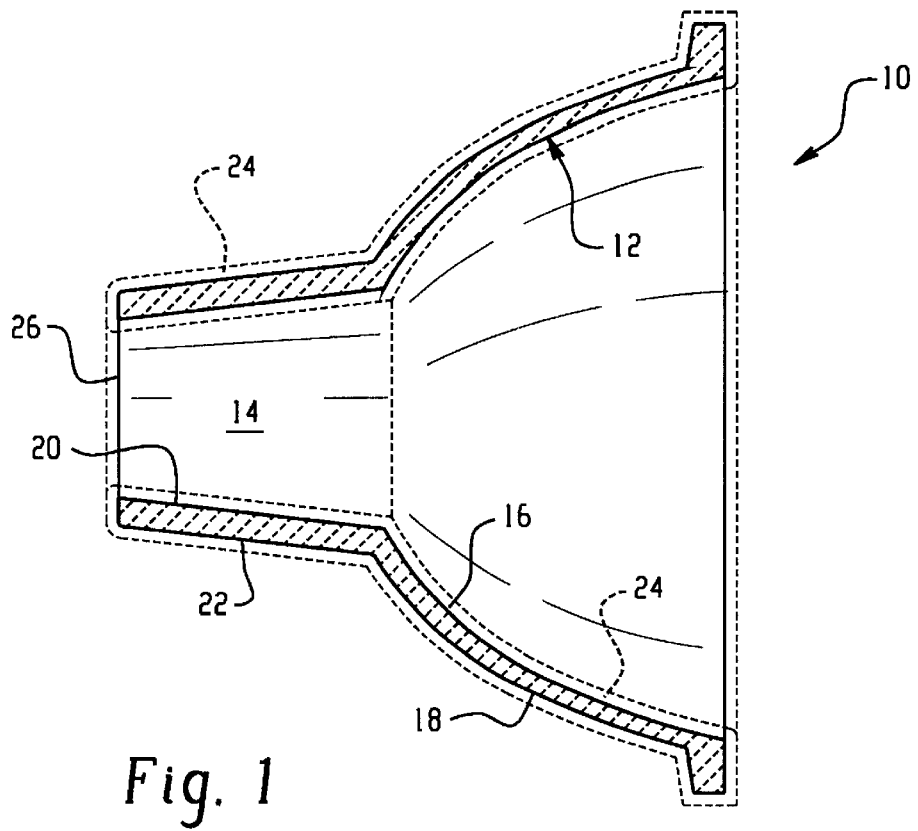
FIG. 1 is a side elevation view, partly in section of a reflector designed in accord with the present invention.

Referring now to FIG. 1, the lamp of the present invention is diagrammatically illustrated. FIG. 1 schematically illustrates an all glass reflector 10 having a parabolic reflecting portion 12 at one end with the other end terminating in an elongated cavity portion 14 for receiving a lamp. The parabolic reflecting portion has internal and external surfaces 16 and 18, respectively, and the elongated rear portion has an internal surface 20 defining a cavity therein, an external surface 22 and an end surface 26. The internal and external reflecting surfaces 16 and 18 of the parabolic reflecting portion 12 are coated with an optical interference coating 24. Coating 24 is an optical interference coating consisting of alternating layers of high and low refractive index material designed to make up the filter desired for projecting light forward of the reflector from a lamp source (not shown) held in the reflector by being cemented into cavity 14 with the optical center of the lamp at the focal point of the reflector. Thus, both the internal and external surfaces 16 and 18, respectively, of parabolic reflecting portion 12 are coated with an optical interference film 24 which film is coherent and continuous around the reflecting inner surface 16 of the parabolic reflecting portion and interior surface 20 of cavity 14, around end 26 and exterior surfaces 22 and 18 of cavity 14 and parabolic reflecting portion 12, respectively. In another embodiment of the invention, just the interior surfaces 16 and 20 of the parabolic reflecting portion 12 and cavity 14, respectively, will be coated which will be sufficient to substantially reduce most of the light exiting through the glass defined between interior and exterior surfaces 20 and 22, respectively, of cavity 14.

Figure 3:
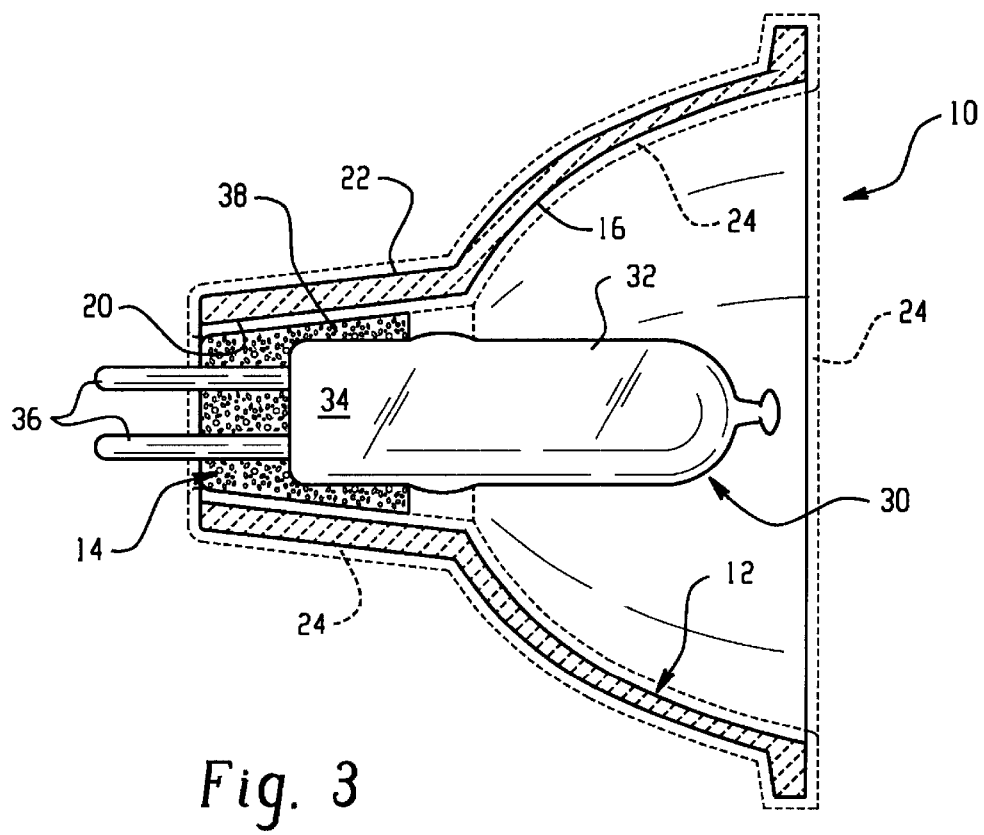
FIG. 3 is a schematic illustration of a reflector in combination with a lamp.

Turning now to FIG. 3 there is schematically illustrated lamp 30 comprising a vitreous envelope 32 hermetically sealed at 34 by means of a customary pinch seal or shrink seal and having exterior leads 36, wherein said lamp is cemented into cavity 14 by cement 38. Lamp and reflector combinations of this type, are known to those skilled in the art as are suitable cements for securing the lamp in the reflector. U.S. Pat. No. 4,833,576, discloses such lamp and reflector combinations and cement for cementing the lamp in the reflector which are useful in the practice of the present invention. Lamp 30 also contains a filament and inleads or an arc (not shown) within envelope 32. A preferred lamp is a tungsten halogen lamp. When energized, lamp 30 emits light, most of the visible portion of which is reflected by coating 24 on the interior surface 16 of parabolic reflecting portion 12 on the interior surface 16 of parabolic reflecting portion 12. If the coating is only on the interior surface 16 some of the visible light escapes out through the cavity portion now shown containing lamp 30 and cement 38 holding lamp 30 in place in the reflector. In the embodiment shown in FIG. 3, all of the surfaces interior and exterior of reflector 10 are coated with an optical interference coating for transmitting infrared radiation and reflecting visible light in the range it is desired to have reflected and projected forwardly of the reflector, with extremely little visible light exiting through the glass of rear cavity, portion 14. However, infrared radiation is permitted to pass through coating 24.

Applying a coating to the interior and/or exterior surfaces of reflector 10 is accomplished in a facile manner employing a low pressure vapor deposition (LPCVD) coating process for applying alternating layers of high and low refractive index materials. In an LPCVD process a suitable metal oxide precursor reagent or reagents for each material of the film is separately introduced into a decomposition chamber wherein it is decomposed or reacted to form the metal oxide on a heated substrate. Separate layers of, for example, silica and tantala or titania are applied onto the substrate in this fashion until the desired filter is achieved. Such chemical vapor deposition techniques are well known to those skilled in the art and are disclosed in, for example, U.S. Pat. Nos. 4,006,481; 4,211,803; 4,393,097; 4,435,445; 4,508,054; 4,565,747 and 4,775,203.

In forming the alternating layers of titania (or tantala) and silica on a glass reflector in accordance with the present invention, the reflector is positioned within a deposition chamber. The chamber is generally contained within a furnace so that the object reaches the desired temperature to achieve the reaction or decomposition and concomitant deposition of the tantala or silica film on the object. These temperatures will generally range between 350°–600° C., depending upon the particular reagent used. For an LPCVD process, the deposition chamber is evacuated and a suitable organometallic precursor of the desired metal oxide, such as titania or silica, in the vapor state is permitted to flow through the deposition chamber by any suitable means. When the reagent flows into the deposition chamber it is decomposed to deposit a film of either titania and silica can be uniformly deposited employing this process and have been successfully deposited on both flat and curved substrates such as lamp envelopes. Uniform layers of titania (or tantala) and silica can be formed ranging from about 100 to 100,000 Å in thickness. When the desired film thickness is achieved, the reagent flow is stopped, the chamber evacuated and the reagent for the other material is flowed into the deposition chamber until the desired thickness of that material is achieved. The process is repeated until the desired multiple layer optical interference coating or filter is formed.

Illustrative, but non-limiting examples of compounds suitable for use in the present invention for depositing a silica film from LPCVD include tetraacetoxy silane, diacetoxy dibutoxy silane, tetraacetoxy silane and silicon tetrakis diethyloxyamine. Suitable reagents for use in the present invention useful for depositing a film of tantala employing LPCVD include tantalum ethoxide, tantalum isopropoxide, tantalum methoxide, tantalum butoxide, mixed tantalum alkoxides and tantalum pentachloride and water and/or oxygen. Titanium tetraethoxide, isopropoxide, isobutoxide and n-propoxide are suitable reagents for depositing titania and pentaethyl niobiate is useful for depositing niobia. No carrier gas is required in the deposition chamber to facilitate movement of the reagent through the chamber, although an inert carrier gas can also be employed, if desired. The pressure in the chamber during the deposition process will, in general, range between about 0.1–4.0 torr, depending upon the reagent used and the temperature of the substrate. The flow rate of the gaseous reagent in the deposition chamber will generally range between about 10–2,000 SCCM, depending upon the size of the reaction chamber, the reagent, presence of a carrier gas and desired rate of deposition, etc.

Another process which is possible to employ to apply an optical interference coating in a uniform manner to all of the interior surfaces of an all glass reflector is an aqueous process which is known to those skilled in the art, an example of which may be found in U.S. Pat. No. 4,701,663. However, in an aqueous process the coating materials must be alternatively applied by spraying or dipping along with spinning and baking or drying in order to achieve uniform coating thicknesses and to enable successive alternating layers to be built up to obtain the film without diffusion of one material into the other. Consequently, an LPCVD or chemical vapor deposition (CVD) process employing a suitable reagent in gaseous form which is decomposed on the surface of the substrate to be coated is a preferred method to apply the optical interference coating to the interior and/or exterior surfaces of the rear cavity portion of an all glass reflector in addition to the interior surface of the parabolic reflecting portion thereof.

Multi-layer optical interference filters used in the lamp industry for applications where the filter will be exposed to high temperatures in excess of 500° C. or more, are made of alternating layers refractory metal oxides such as tantala (tantalum pentoxide), titania (titanium dioxide), niobium (niobium pentoxide) and silica ($SiO_2$) wherein the silica is the low refractive index material and the tantala, titanium or niobia is the high refractive index material. An important advantage of the present invention is the utilization of these materials (metal oxides) which are stable at high temperatures as opposed to a prior art utilization of a zinc sulfide coating which is more temperature sensitive.

Figure 2:
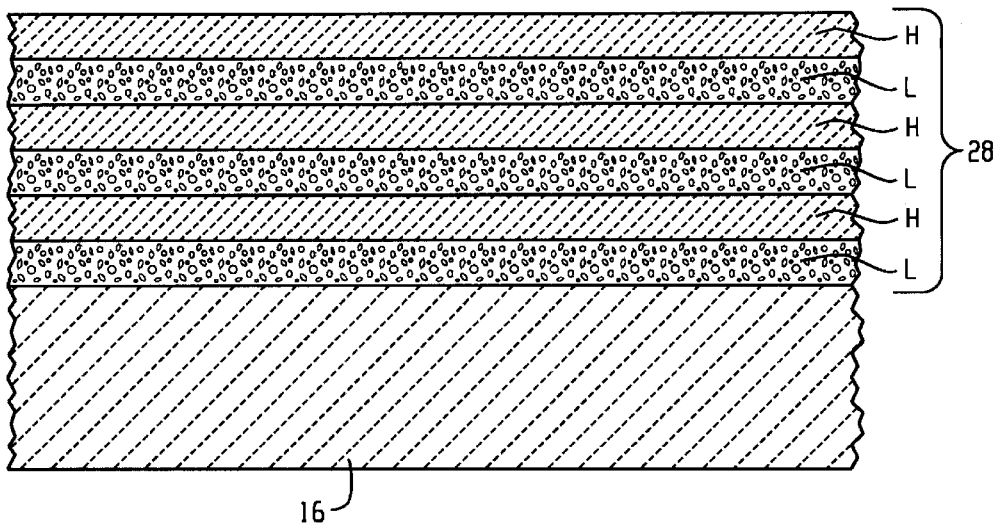
FIG. 2 is an exploded view of the coating on the reflector surface of FIG. 1.

FIG. 2 reflects a particularly preferred form of the invention comprised of coating 24 having 28 layers of alternating high and low index refractive index materials. The detail illustrated in FIG. 2 is meant to be only for purposes of illustration and not a detail or scale representation of the coating. H and L represent the alternating layers of high (H) and low (L) index of refraction materials. In a particularly preferred form of the invention, the high index of refraction material will comprise titanium dioxide and the low index of refraction material is comprised of silica. A particularly preferred structure is provided in Table 1 wherein thicknesses are set forth in angstroms.

| Layer | Thickness | Material |
|---|---|---|
| 1 | 319.0 | H |
| 2 | 1260.0 | L |
| 3 | 666.0 | H |
| 4 | 994.0 | L |
| 5 | 755.0 | H |
| 6 | 1189.0 | L |
| 7 | 574.0 | H |
| 8 | 1482.0 | L |
| 9 | 564.0 | H |
| 10 | 1323.0 | L |
| 11 | 610.0 | H |
| 12 | 1180.0 | L |
| 13 | 608.0 | H |
| 14 | 1071.0 | L |
| 15 | 590.0 | H |
| 16 | 1109.0 | L |
| 17 | 433.0 | H |
| 18 | 1337.0 | L |
| 19 | 485.0 | H |
| 20 | 983.0 | L |
| 21 | 452.0 | H |
| 22 | 838.0 | L |
| 23 | 437.0 | H |
| 24 | 829.0 | L |
| 25 | 357.0 | H |
| 26 | 1075.0 | L |
| 27 | 176.0 | H |
| 28 | 1601.0 | L |

Figure 4:
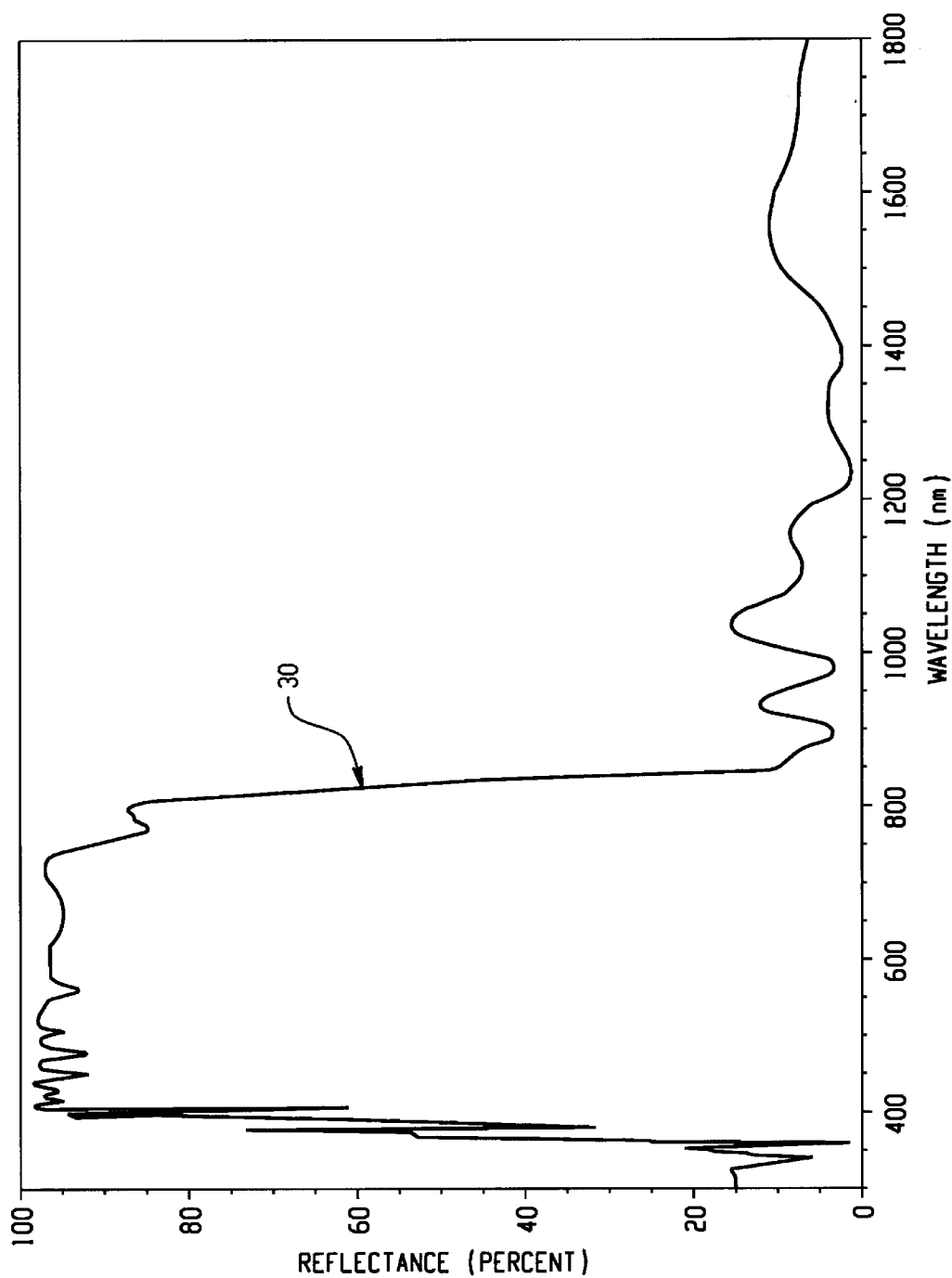
FIG. 4 is a graphical representation of the design reflectance curve between 400 and 1,800 nanometers of the lamp of FIG. 1.
Figure 5:
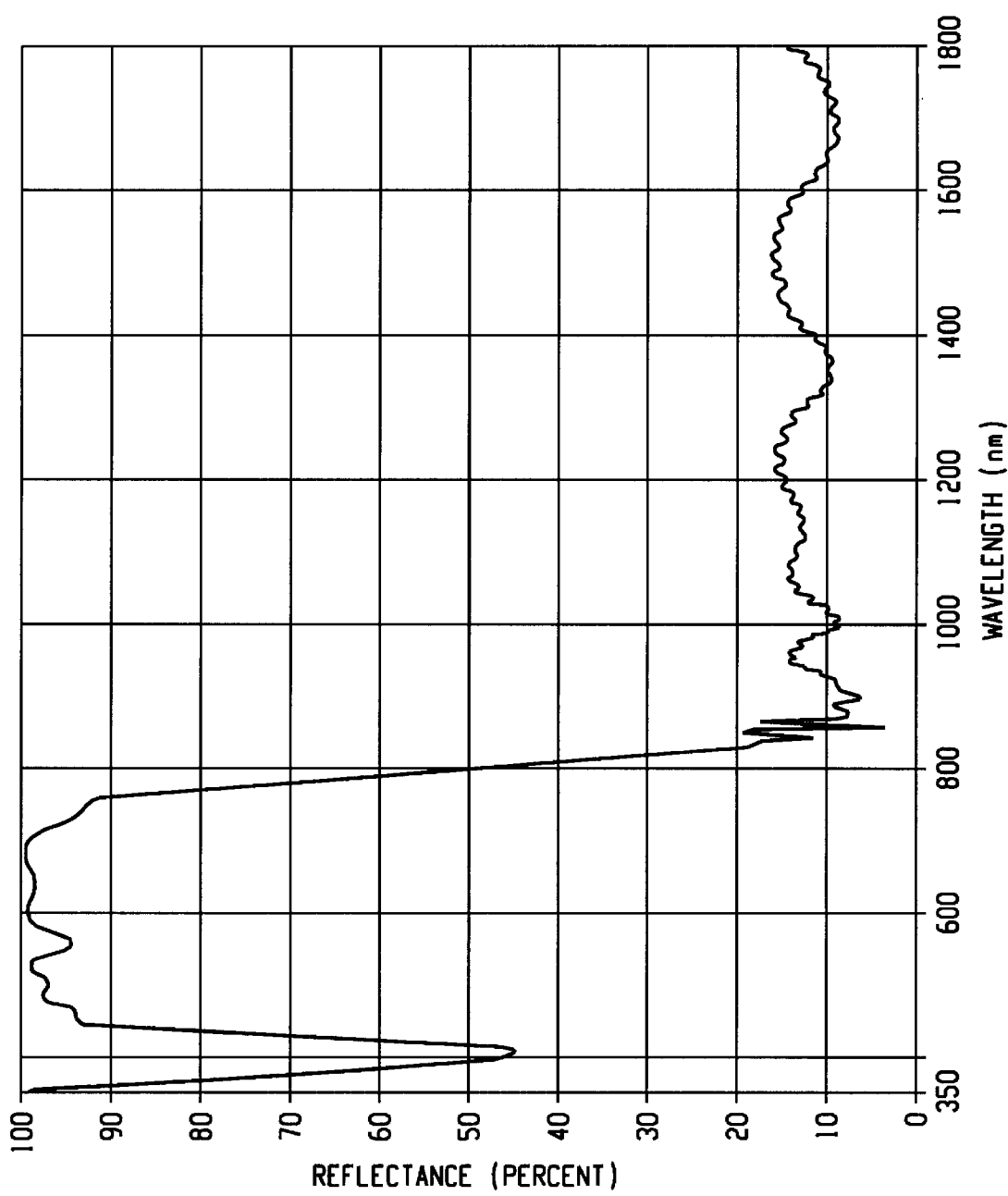
FIG. 5 is a graphical representation of the measured reflectance curve of a commercially available MR™ lamp.

The present invention is particularly advantageous because the right hand edge 30 of the reflectance curve (see FIG. 4) is close to 800 nm, preferably at about 830 nm. Moreover, the amount of reflected infrared radiation (i.e., above 770 nanometers) is low. Similarly, the amount of reflectance above the right hand edge has been reduced such that reflectance peaks are below 20% above 900 nanometers, preferably above 830 nm. In contrast, the reflectance peaks of the prior art MR™ lamp (a ZnS/SiO$_2$ coating) exceed 20% above 800 nm and, in fact, even above 900 nm (see FIG. 5). The results in the present coating having an average reflectance of below about 8% between 850 and 1800 nm.

Figure 6:
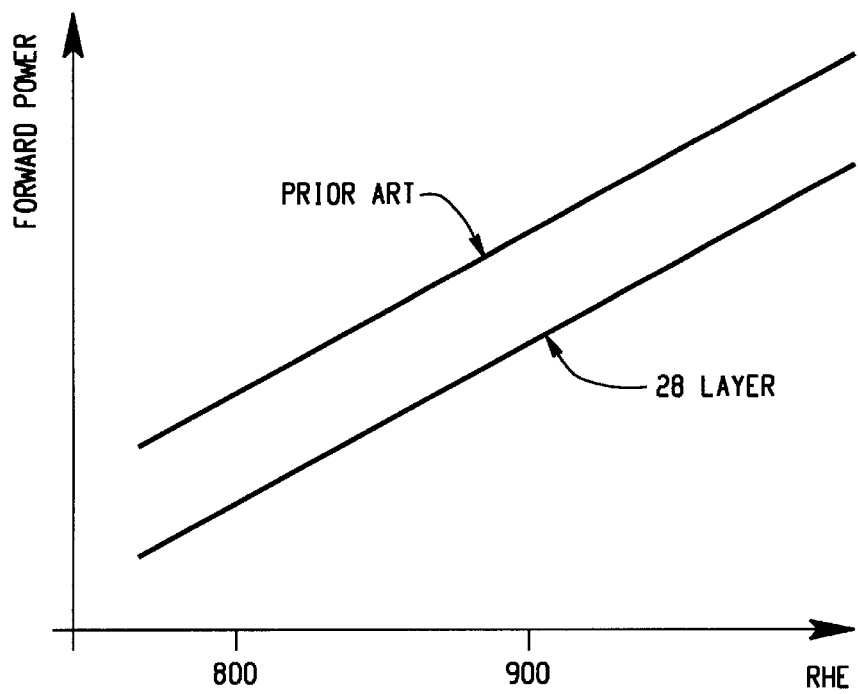
FIG. 6 is a graphical representation of forward power versus the right hand edge of the MR™ lamp coating and the present inventive coating.

In this context, the reflector lamp of FIG. 3 advantageously directs more heat energy (non-light generating) rearwardly, through the reflector, resulting in a reduction in forward power (visible light and heat). This feature is schematically illustrated in FIG. 6 wherein the forward power of the present inventive design is reduced from that of the MR™ lamp coating above each coatings' respective right hand edge. Consequently, the present inventive lamp relative to the MR™ lamp demonstrates reduced forward heat for equivalent lumen generation. Similarly, color temperature is increased from 50° K to 100° K depending upon the lamp type which is being compared.

Although the invention has been described with reference to exemplary embodiments, various changes and modifications can be made without departing from the scope and spirit of the invention. Accordingly, these modifications obvious to the skilled artisan are intended to fall within the scope of the invention as defined by the following claims.

What is claimed is:

1. A lamp comprising a light source and a reflector, said reflector including a coating over a major portion of at least an inner or outer surface, said coating being comprised of multiple layers of high and low index of refraction materials wherein said coating has at least 90% reflectance between about 425 and 750 nanometers and less than 20% reflectance peaks between about 900 and 1800 nanometers.

2. The lamp of claim 1 having reflectance peaks of below about 20% at wavelengths above 830 nanometers.

3. The lamp of claim 1 wherein said high index of refraction material comprises titania and said low index of refraction material comprised of silica.

4. The lamp of claim 1 wherein said coating consists of 28 alternating layers of high and low index of refraction materials.

5. The lamp of claim 1 further including a coating on both said outer surface and said inner surface.

6. The lamp of claim 1 wherein said light source comprises a filament.

7. The lamp of claim 1 wherein said light source comprises a gas discharge.

8. The lamp of claim 1 wherein said light source is a halogen lamp.

9. The lamp of claim 1 wherein said reflector has a generally parabolic shape.

10. A lamp comprising a light source and a reflector, said reflector including a coating over a major portion of at least an inner or outer surface, said coating being comprised of multiple layers of high and low index of refraction materials wherein said coating has at least 90% reflectance between about 425 and 750 nanometers and an average reflectance of below about 8% between about 850 nanometers and 1800 nanometers.

11. The lamp of claim 10 wherein said high index of refraction material comprises titania and said low index of refraction material comprised of silica.

12. The lamp of claim 10 wherein said coating consists of 28 alternating layers of high and low index of refraction materials.

13. The lamp of claim 10 further including a coating on both said outer surface and said inner surface.

* * * * *